US011406161B2

(12) United States Patent
Falvai (10) Patent No.: US 11,406,161 B2
(45) Date of Patent: Aug. 9, 2022

(54) FLEXIBLE COUPLER SYSTEM AND METHODS OF OPERATION

(71) Applicant: Mark Falvai, Malibu, CA (US)

(72) Inventor: Mark Falvai, Malibu, CA (US)

( * ) Notice: Subject to any disclaimer, the term of this patent is extended or adjusted under 35 U.S.C. 154(b) by 12 days.

(21) Appl. No.: 16/812,318

(22) Filed: Mar. 8, 2020

(65) Prior Publication Data

US 2020/0288817 A1 Sep. 17, 2020

Related U.S. Application Data

(60) Provisional application No. 62/816,282, filed on Mar. 11, 2019.

(51) Int. Cl.
| | |
|---|---|
| *A44B 11/00* | (2006.01) |
| *A44B 1/12* | (2006.01) |
| *A44B 1/02* | (2006.01) |
| *A44B 1/06* | (2006.01) |
| *B60R 22/18* | (2006.01) |

(52) U.S. Cl.
CPC ............... *A44B 1/126* (2013.01); *A44B 1/02* (2013.01); *A44B 1/06* (2013.01); *A44D 2200/10* (2013.01); *B60R 22/18* (2013.01); *Y10T 24/47* (2015.01)

(58) Field of Classification Search
CPC ........... Y10T 24/4755; Y10T 24/45969; Y10T 24/47; Y10T 24/4095; A44D 2200/10; A44B 1/06; A44B 1/02; A44B 1/126
See application file for complete search history.

(56) References Cited

U.S. PATENT DOCUMENTS

| 849,282 A * | 4/1907 | Stukenborg ............. A41F 11/16 |
| | | 2/315 |
| 5,445,385 A * | 8/1995 | Brooks .............. A63B 69/0059 |
| | | 473/214 |
| 5,829,170 A * | 11/1998 | Lutz, Jr. ............... A43B 5/1683 |
| | | 36/72 R |
| 8,387,844 B2 * | 3/2013 | Wrigley .................... A45F 3/14 |
| | | 224/614 |
| 9,290,150 B2 * | 3/2016 | Gaiser ................. B60R 21/2338 |
| 2008/0036188 A1 * | 2/2008 | Gould ................... B60R 21/276 |
| | | 280/739 |
| 2008/0100049 A1 * | 5/2008 | Webber ............... B60R 21/2338 |
| | | 280/743.2 |

(Continued)

*Primary Examiner* — Robert Sandy
*Assistant Examiner* — Michael S Lee
(74) *Attorney, Agent, or Firm* — Trent Baker; Baker IP PLLC (57) ABSTRACT

One embodiment of the present invention relates to a releasable flexible coupling system comprising a base, a coupling member, and a sewn member. The coupling member is fixably coupled to the base across the widthwise dimension on opposite sides of the lengthwise dimension forming a recess between the base and the coupling member. The sewn member comprises a strap, a folded region, and a primary stitch. The strap includes a body and a lengthwise end. The folded region is disposed on the lengthwise end of the strap and includes a portion that overlaps the body. The primary stitch extends through both the folded region and the body of the strap. An optional stiffener may be disposed between the lengthwise end of the strap and the folded region. The primary stitch will also extend through the stiffener if present.

20 Claims, 5 Drawing Sheets

(56) References Cited

U.S. PATENT DOCUMENTS

| | | | |
|---|---|---|---|
| 2008/0189917 A1* | 8/2008 | Maley | A45C 13/30 24/197 |
| 2008/0301912 A1* | 12/2008 | Maley | A44B 11/2584 24/114.7 |
| 2010/0107371 A1* | 5/2010 | Hofmann | B60R 21/2338 24/265 A |
| 2012/0198667 A1* | 8/2012 | Falvai | A44B 11/258 24/698.1 |

* cited by examiner

FLEXIBLE COUPLER SYSTEM AND METHODS OF OPERATION

FIELD OF THE INVENTION

The invention generally relates to flexible coupling systems. In particular, the present invention relates to a releasable, flexible, modular coupling system and methods of operation.

RELATED APPLICATIONS

This application claims priority to U.S. provisional application Ser. No. 62/816,282 filed Mar. 11, 2019, the contents of which are incorporated by reference.

BACKGROUND OF THE INVENTION

Coupling systems attach members/components to one another. One type of coupling system is a releasable coupling system that enables a user to repeatedly couple or decouple members from one another. For example, a conventional automobile seatbelt is a releasable coupling system which may be used to secure a passenger in a particular seat. Likewise, a belt is a releasable coupling system for securing pants around a user's waist. Releasable coupling systems include multiple components which are coupled together. An automobile seatbelt includes at least two straps and two intercoupling buckles. Likewise, a belt includes one strap and one buckle.

Releasable coupling systems may be used for a variety of applications, each corresponding to a hierarchy of optimal performance characteristics. For example, releasable coupling systems on outdoor backpacks require both high durability and low weight for optimal performance. In contrast, releasable coupling systems used for securing a payload on a truck require high durability and high force tolerance. Additional performance factors include manufacturing cost, appearance, intuitive operation, etc. Therefore, the performance characteristics of certain releasable coupling systems may be more or less optimal for certain applications. For example, a VELCRO snap-lock releasable coupling is beneficial for many lightweight applications including a pocket flap closure system. However, a cam buckle is more appropriate for heavier-weight applications because of its relative weight and force tolerance.

Conventional releasable coupling systems fail to provide optimal performance characteristics for use as a modular, soft good, releasable coupling system. A modular releasable coupling system is further defined as a releasable coupling system which facilitates efficient intercoupling of a variety of components in addition to the performance characteristics for a releasable coupling system. For example, the military MOLLE (modular lightweight load-carrying equipment) includes a plurality of PAL (pouch attach ladder) straps that facilitate the releasable coupling of various components to a base member. The system is used primarily on military outerwear such as vests and corresponding components in order to facilitate selective intercoupling schemes and accommodate specific functions. Unfortunately, conventional modular releasable coupling systems including the MOLLE system do not optimize performance characteristics for retail applications. For example, the MOLLE system requires numerous unattractive horizontal straps for intercoupling components. In addition, the MOLLE system and other modular systems require a non-intuitive complex coupling method. Further, most existing modular coupling systems do not include buckles, which could be useful for selectively coupling and/or spacing components.

In addition, conventional soft good coupling systems often require a rigid coupler of some type to engage with the soft good base of a particular bag or article of clothing. The manufacturing of a rigid coupler requires precise tooling to ensure proper coupling characteristics.

Therefore, there is a need in the industry for an improved flexible coupling system, including system components and an intuitive method of operation.

SUMMARY OF THE INVENTION

The present invention generally relates to an improved flexible coupling system. One embodiment of the present invention relates to a releasable flexible coupling system comprising a base, a coupling member, and a sewn member. The coupling member is fixably coupled to the base across the widthwise dimension on opposite sides of the lengthwise dimension, forming a recess between the base and the coupling member. The sewn member comprises a strap, a folded region, and a primary stitch. The strap includes a body and a lengthwise end. The folded region is disposed on the lengthwise end of the strap and includes a portion that overlaps the body. The primary stitch extends through both the folded region and the body of the strap. An optional stiffener may be disposed between the lengthwise end of the strap and the folded region. The primary stitch will also extend through the stiffener, if present. A second embodiment of the present invention relates to a method for releasably coupling a sewn member to a base comprising the acts of providing a base, a coupling member, and a sewn member; coupling the coupling member to the base; routing the sewn member through a recess between the coupling member and the base; hooking the sewn member over the coupling member.

Embodiments of the present invention represent a significant advance in the field of releasable coupling systems. Conventional releasable coupling systems fail to provide all the performance characteristics of the present invention, including but not limited to modularity, intuitive operation, maximum durability, and minimum weight. In particular, embodiments of the present invention may be used to couple a buckle to a base. The base may be a soft good member such as a garment, carrying device, or load bearing strap. The system may be used for releasable coupling of an individual location such as the releasable closure of a pocket or pouch. The system may also be used as a modular coupling system to facilitate multiple releasable coupling locations. In contrast to many releasable coupling systems (i.e. VELCRO, snap locks, etc.), embodiments of the present invention provide durable, releasable coupling that is resistant to incidental compression forces and/or debris accumulation. In addition, components of the present invention are capable of being efficiently manufactured.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

The following description of the invention can be understood in light of the Figures, which illustrate specific aspects of the invention and are a part of the specification. Together with the following description, the Figures demonstrate and explain the principles of the invention. In the Figures, the physical dimensions may be exaggerated for clarity. The same reference numerals in different drawings represent the same element, and thus their descriptions will be omitted.

DETAILED DESCRIPTION OF THE INVENTION

The present invention relates to improved coupling systems. One embodiment of the present invention relates to a releasable flexible coupling system comprising a base, a coupling member, and a sewn member. The coupling member is fixably coupled to the base across the widthwise dimension on opposite sides of the lengthwise dimension forming a recess between the base and the coupling member. The sewn member comprises a strap, a folded region, and a primary stitch. The strap includes a body and a lengthwise end. The folded region is disposed on the lengthwise end of the strap and includes a portion that overlaps the body. The primary stitch extends through both the folded region and the body of the strap. An optional stiffener may be disposed between the lengthwise end of the strap and the folded region. The primary stitch will also extend through the stiffener if present. A second embodiment of the present invention relates to a method for releasably coupling a sewn member to a base comprising the acts of providing a base, a coupling member, and a sewn member; coupling the coupling member to the base; routing the sewn member through a recess between the coupling member and the base; hooking the sewn member over the coupling member. Also, while embodiments are described in reference to a soft good coupling system, it will be appreciated that the teachings of the present invention are applicable to other areas including but not limited to hard good coupling.

Figure 1:
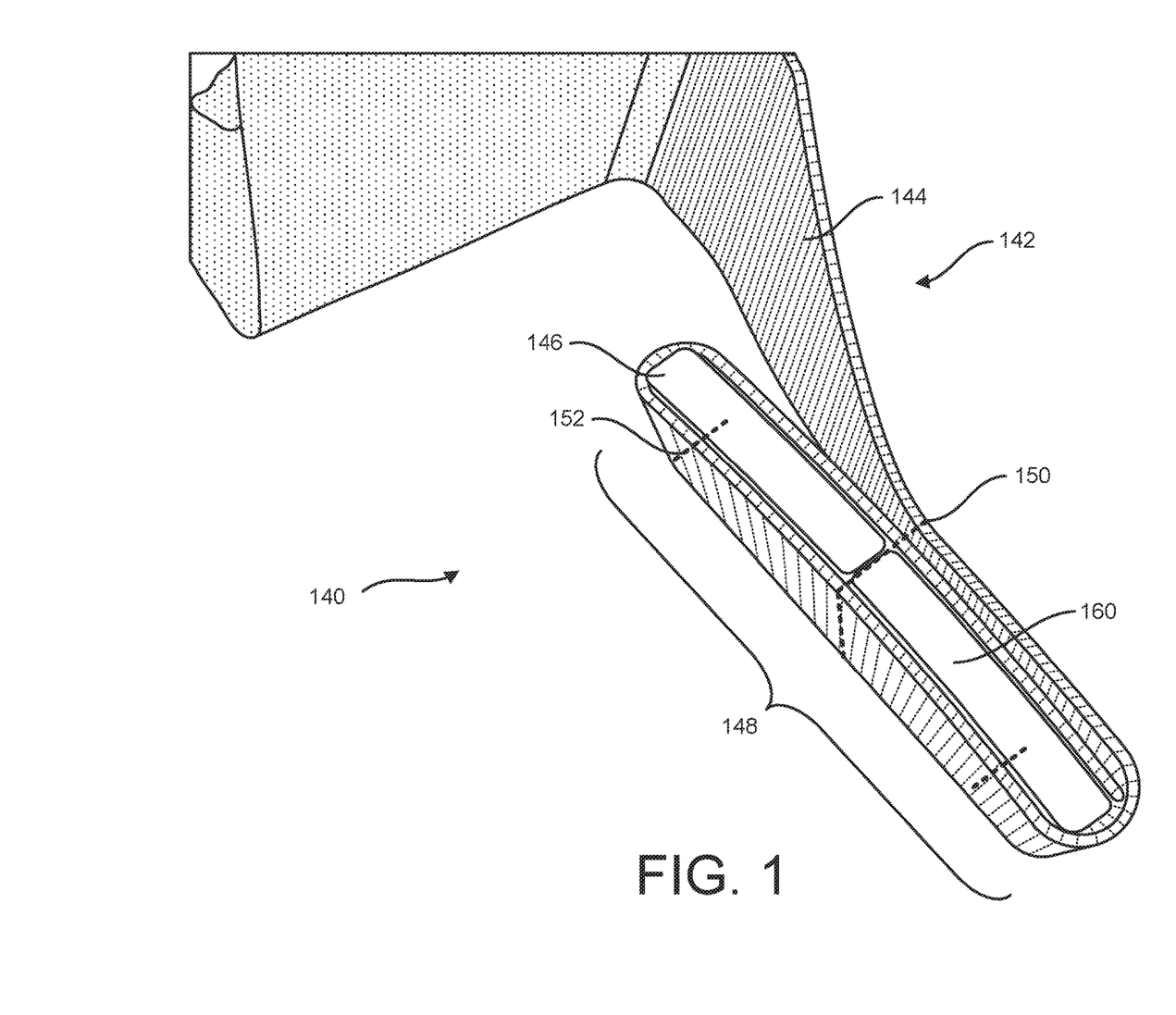
FIG. 1 illustrates a perspective view of a sewn member in accordance with embodiments of the present invention.
Figure 2:
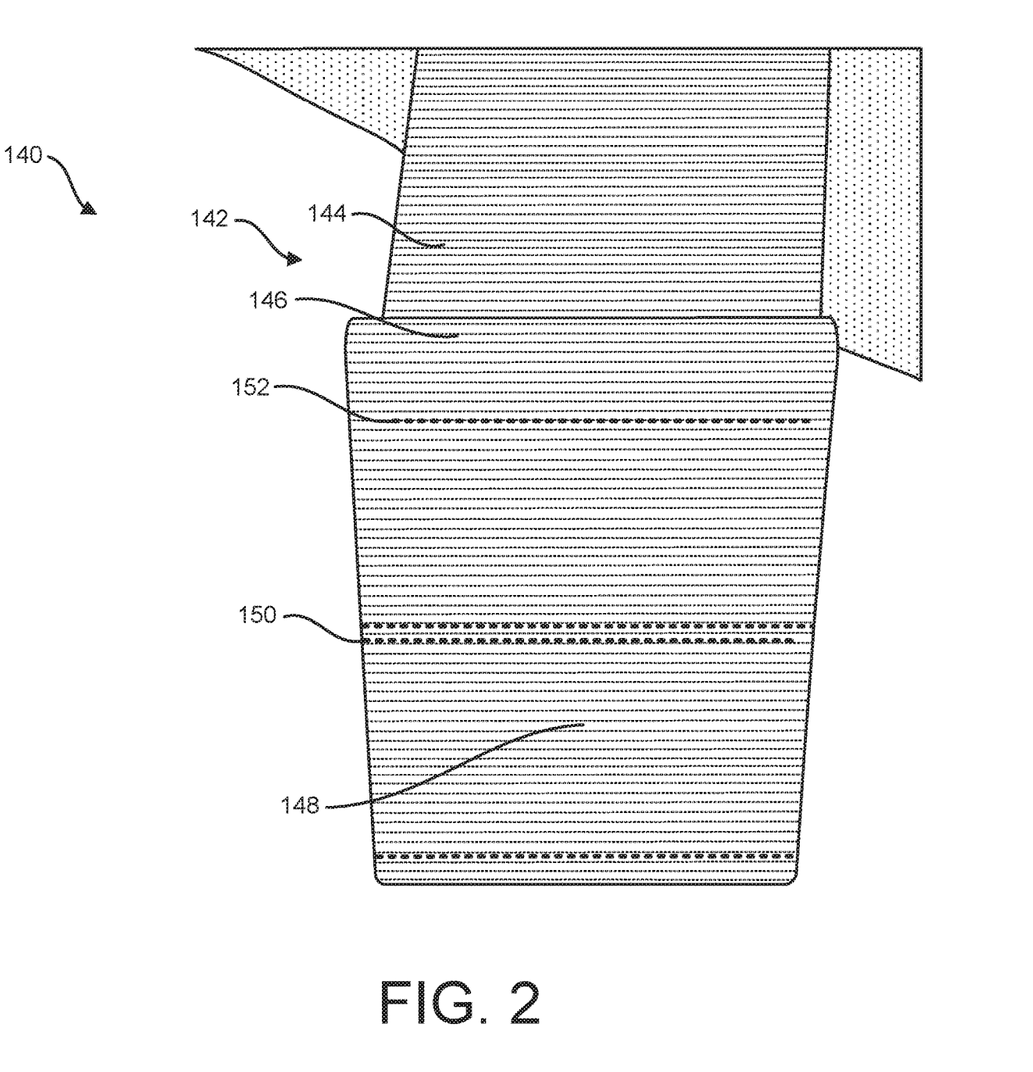
FIG. 2 illustrates an alternative perspective view of a sewn member in accordance with embodiments of the present invention.

Reference is initially made to FIGS. 1-2, which illustrates a sewn member in accordance with embodiments of the present invention, designated generally at 140. The sewn member includes a strap 142, a folded region 148, and a primary stitch 150. The strap 142 is a lengthwise flexible member such as a piece of nylon webbing. The sewn member 140 includes a lengthwise end 146 which is included within the folded region 148. The folded region 148 includes overlapping the lengthwise end 146 of the strap 142 back over a portion of the strap's body 144 as shown. A primary stitch 150 is routed through both the strap body 144 and the folded region 148, as shown. An optional stiffener 160 may be disposed between the strap body 144 and the folded region 148 for adding additional stiffness to the sewn member 140. It will be appreciated that the stiffener 160 may still be flexible and composed of a material such as plastic or rubber. The stiffener 160 comprises a material that is less flexible than the strap 142. The primary stitch 150 will extend through the strap body 144, the folded region 148, and the stiffener 160, if present. At least one optional secondary stitch 152 may also be extended through the folded region 148 and the stiffener 160 as shown. The configuration of the folded region 148 and primary stitch 150 substantially create a T-shaped region which may be referred to as a toggle type coupler. FIGS. 1 and 2 illustrates the positioning of the folded region 148, primary stitch 150, and optional stiffener 160. It will be appreciated that various configurations of the folded region 148 and primary stitch 150 may be incorporated in accordance with alternative embodiments of the present invention.

Figure 3:
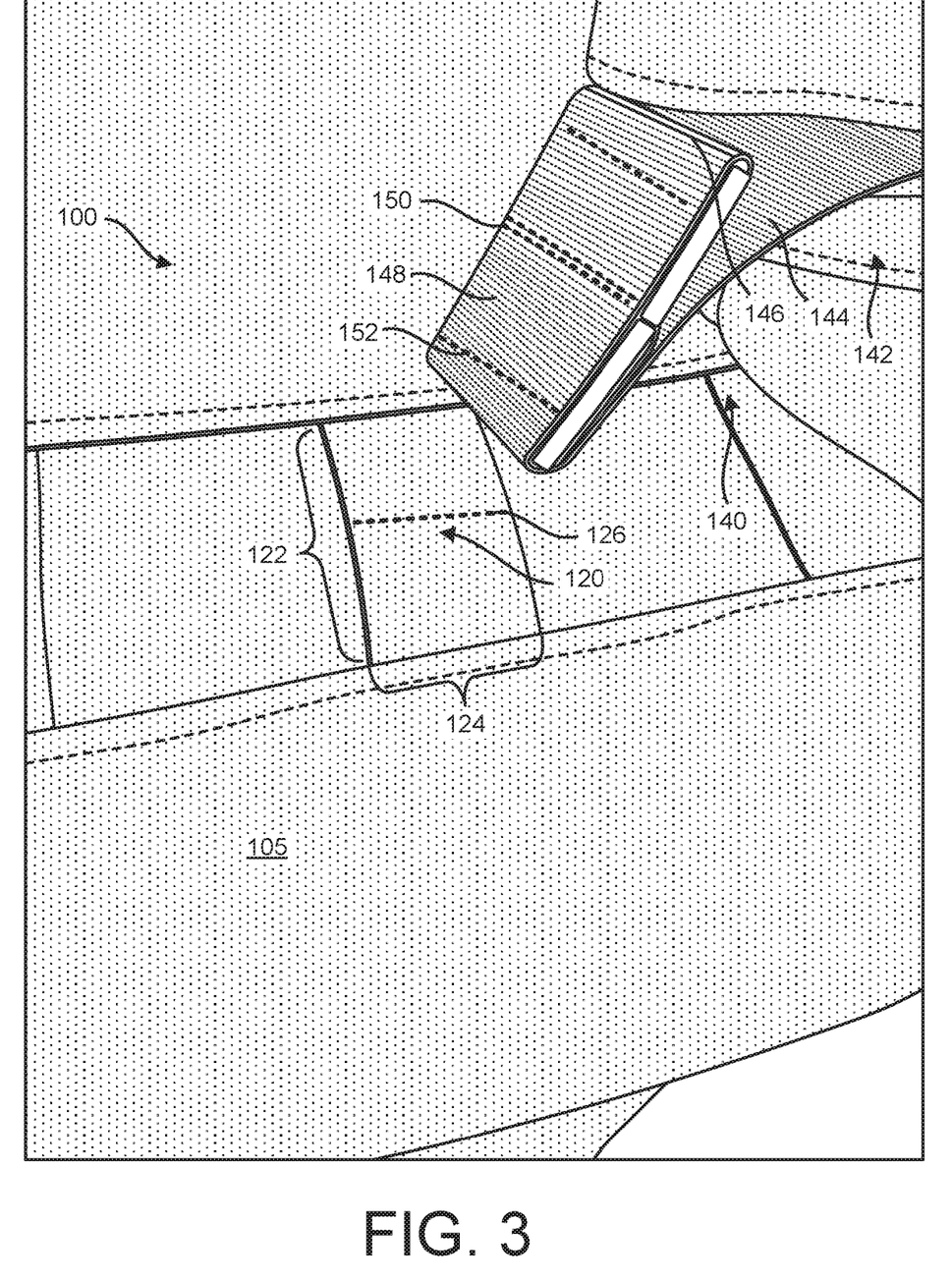
FIG. 3 illustrates the sewn member of FIGS. 1 and 2 positioned for coupling with a coupling member and base in accordance with embodiments of the present invention.

Reference is next made to FIG. 3, which illustrates a sewn member 140 oriented to couple with a base 105 via a coupling member 120. The base 105 may comprise a non-elastic woven material, including but not limited to Cordura, cotton, nylon, etc. The base 105 may be a portion of a garment or carrying apparatus, including but not limited to a vest, jacket, backpack, bag, messenger bag, shoulder bag, etc. It will be appreciated that any type of base 105 may be used in accordance with embodiments of the present invention. FIG. 3 illustrates a portion of an outer panel of a backpack, which will be referred to as the base 105 for the remainder of the application. Although not shown, the base 105 may include a plurality of coupling members 120 oriented in a pattern. The pattern of coupling members 120 includes a plurality of individual coupling members 120 oriented in a lengthwise manner. The coupling members 120 are coupled to the base 105 on each of the lengthwise sides, creating a recess 126 between the coupling members 120 and the base 105. This type of coupling member 120 orientation is similar to a military MOLLE system. Various types of stitching may be used to couple the coupling members to the base 105, including conventional stitching, chemical adhesion, welding, etc. The sewn member 140 is shown next to the coupling member 120 to illustrate the dimensional correspondence between the width of the sewn member 140 and the recess 126 between the coupling member 120 and the base 105. It is critical that the width of the sewn member 140 be smaller than the width of the recess 126 to facilitate the releasable coupling described below.

Figure 4:
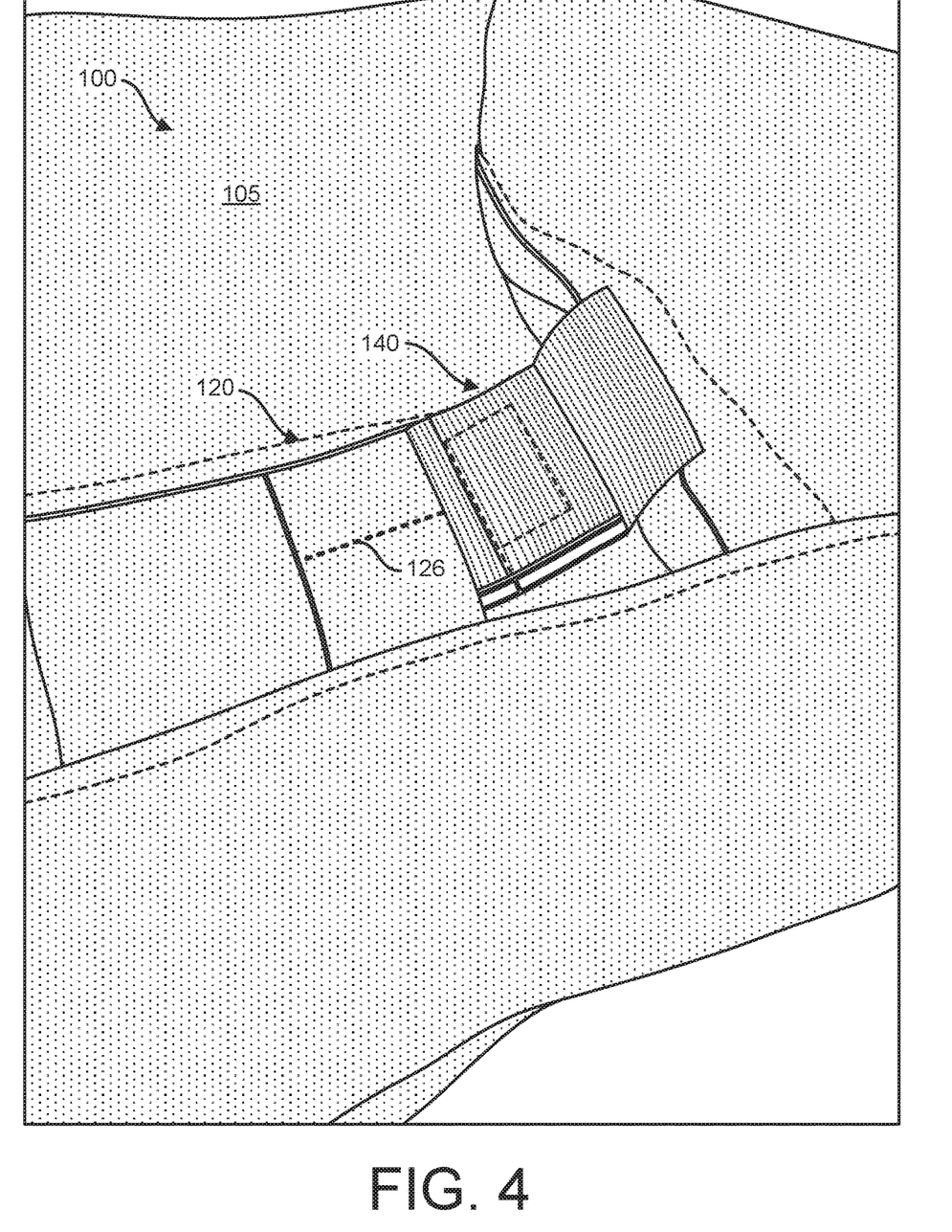
FIG. 4 illustrates the sewn member of FIG. 3 partially extended through the recess of the coupling member in accordance with embodiments of the present invention.

Reference is next made to FIG. 4, which illustrates a sewn member 140 routed through the recess 126 between the coupling member 120 and the base 105. The sewn member 140 may be selectively routed through the recess 126 between the coupling member 120 and the base 105, so as to engage the releasable coupling. The coupling member 120 may be elastic and include a flush state and an extended state. The flush state of the coupling member 120 includes orienting the coupling member 120 substantially parallel with a portion of the base 105 over which the coupling member 120 is disposed. The extended state of the coupling member 120 includes extending a portion of the coupling member 120 away from the portion of the base 105, over which the coupling member 120 is disposed. A user may selectively engage the extended state of the coupling member 120 to enable the user to more easily route the sewn member 140 through the recess 126.

Figure 5:
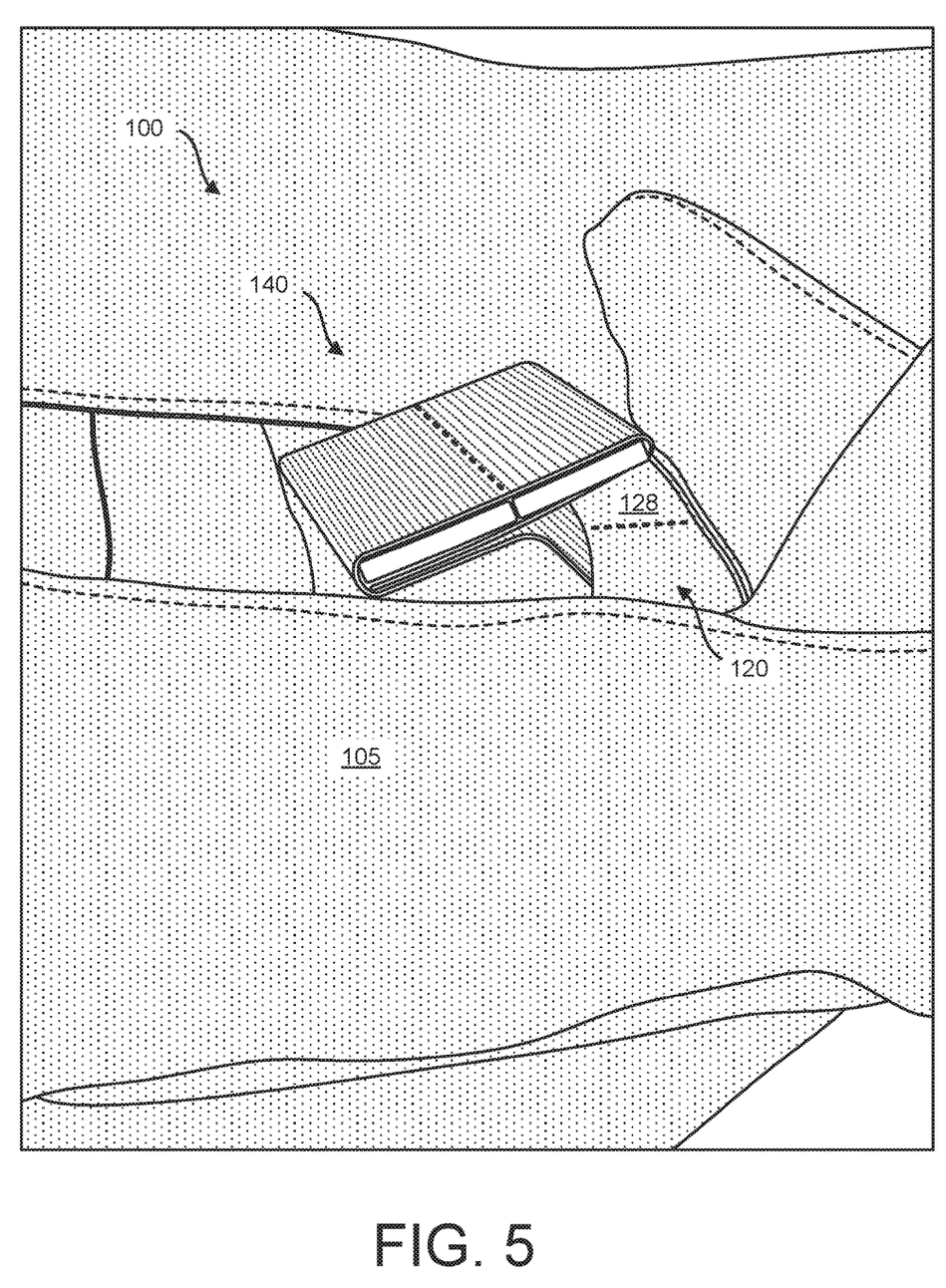
FIG. 5 illustrates the sewn member releasably coupled with the base and coupling member, including hooking the folded region over the coupling member.

Reference is next made to FIG. 5, which illustrates the sewn member 140 coupled to the base 105 via the recess 126 between the coupling member 120 and the base 105. To engage the releasable coupling, the user must route the entire sewn member 140 through the recess 126 such that the folded region 148 hooks over the coupling member 120. Therefore, any additional tensile pulling force applied to the strap 142 will only further engage the coupling between the sewn member 120 and the base 105. The coupling system prevents accidental release because the user must selectively depress the folded region 148 of the sewn member 140 back under the recess 126 of the coupling member 120 in order to release the coupling.

It will be appreciated that embodiments of the present invention include methods of coupling and decoupling the sewn coupler with a base 105. The method of coupling further includes the act of routing the sewn member 140 through the recess 126 and hooking the folded region 148 over the coupling member 120, thereby engaging the coupling between the sewn member 140 and the base 105.

It should be noted that various alternative system designs may be practiced in accordance with the present invention, including one or more portions or concepts of the embodiment illustrated in FIG. 1 or described above. Various other embodiments have been contemplated, including combinations in whole or in part of the embodiments described above.

What is claimed is:

1. A flexible coupling system comprising:
   a base, wherein the base is a flexible member;
   a coupling member coupled to the base having a lengthwise dimension, and a widthwise dimension, wherein the coupling member is coupled to the base across the widthwise dimension on opposite sides of the lengthwise dimension, and wherein a recess is formed between the base and the coupling member and further between the two opposite sides of the lengthwise dimension;
   a sewn member comprising:
      a strap having a body and a lengthwise end;
      a folded region including the lengthwise end of the strap, wherein the folded region overlaps the body, and wherein the folded region corresponds to the recess such that the folded region includes a width and thickness that fits within the recess, and wherein the sewn member includes a stiffener disposed between the folded region and the body, and wherein the primary stitch extends through the folded region, the stiffener, and the body of the strap, and wherein the stiffener comprises a material less flexible than the strap; and
      a primary stitch extending through both the folded region and the body of the strap.

2. The system of claim 1, wherein the stiffener comprises a plastic material.

3. The system of claim 1, wherein the sewn member further includes at least one secondary stitch extending only through the folded region and the stiffener.

4. The system of claim 1, wherein the sewn member comprises nylon webbing.

5. The system of claim 1, wherein the coupling member comprises an elastic material with a flush state and an extended state.

6. The system of claim 5, wherein the flush state comprises the coupling member substantially parallel with a portion of the base over which the coupling member is disposed.

7. The system of claim 5, wherein the extended state comprises extending a portion of the coupling member away from a portion of the base over which the coupling member is disposed.

8. The system of claim 1, wherein the base comprises a non-elastic woven material.

9. The system of claim 1, wherein the stiffener comprises a chemical coating.

10. The system of claim 1, wherein the stiffener comprises a rubber material.

11. The system of claim 1, wherein the configuration of the primary stitch forms a substantially flexible T-shape between the folded region and the body of the strap.

12. A flexible coupling system comprising:
    a base;
    a coupling member coupled to the base having a lengthwise dimension, and a widthwise dimension, wherein the coupling member is coupled to the base across the widthwise dimension on opposite sides of the lengthwise dimension, and wherein a recess is formed between the base and the coupling member and further between the two opposite sides of the lengthwise dimension, and wherein the coupling member comprises an elastic material;
    a sewn member comprising:
       a strap having a body and a lengthwise end;
       a folded region including the lengthwise end of the strap, wherein the folded region overlaps the body, and wherein the folded region corresponds to the recess such that the folded region includes a width and thickness that fits within the recess, and wherein the sewn member includes a stiffener disposed between the folded region and the body, and wherein the primary stitch extends through the folded region, the stiffener, and the body of the strap, and wherein the stiffener comprises a material less flexible than the strap; and
       a primary stitch extending through both the folded region and the body of the strap substantially forming a flexible T-shape between the folded region and the body of the strap.

13. A method of coupling a flexible sewn member with a coupling member comprising the acts of
    providing a base;
    providing a coupling member coupled to the base having a lengthwise dimension, and a widthwise dimension, wherein the coupling member is coupled to the base across the widthwise dimension on opposite sides of the lengthwise dimension, and wherein a recess is formed between the base and the coupling member and further between the two opposite sides of the lengthwise dimension;
    providing a sewn member comprising:
       a strap having a body and a lengthwise end;
       a folded region including the lengthwise end of the strap, wherein the folded region overlaps the body, and wherein the folded region corresponds to the recess such that the folded region includes a width and thickness that fits within the recess, and wherein the sewn member includes a stiffener disposed between the folded region and the body, and wherein the primary stitch extends through the folded region, the stiffener, and the body of the strap, and wherein the stiffener comprises a material less flexible than the strap; and
       a primary stitch extending through both the folded region and the body of the strap;
    extending the folded region of the sewn member through the recess between the coupling member and the base; and
    hooking the folded region over the coupling member.

14. The method of claim 13, wherein the act of extending the folded region of the sewn member through the recess further includes aligning the folded region with the recess.

15. The method of claim 14, wherein the act of extending the folded region of the sewn member through the recess further includes extending the coupling member away from the base to expand the recess.

16. The method of claim 13, wherein the act of hooking the folded region over the coupling member further includes retracting a portion of the sewn member through the recess causing the folded region to extend over the coupling member.

17. The method of claim 13, wherein the coupling member comprises an elastic material.

18. The method of claim 13, wherein the configuration of the primary stich forms a substantially flexible T-shape between the folded region and the body of the strap.

19. The system of claim 13, wherein the sewn member includes a stiffener disposed between the folded region and the body, and wherein the primary stitch extends through the folded region, the stiffener, and the body of the strap.

20. The system of claim 19, wherein the stiffener comprises a material that is less flexible than the strap.

\* \* \* \* \*